Figure 1:
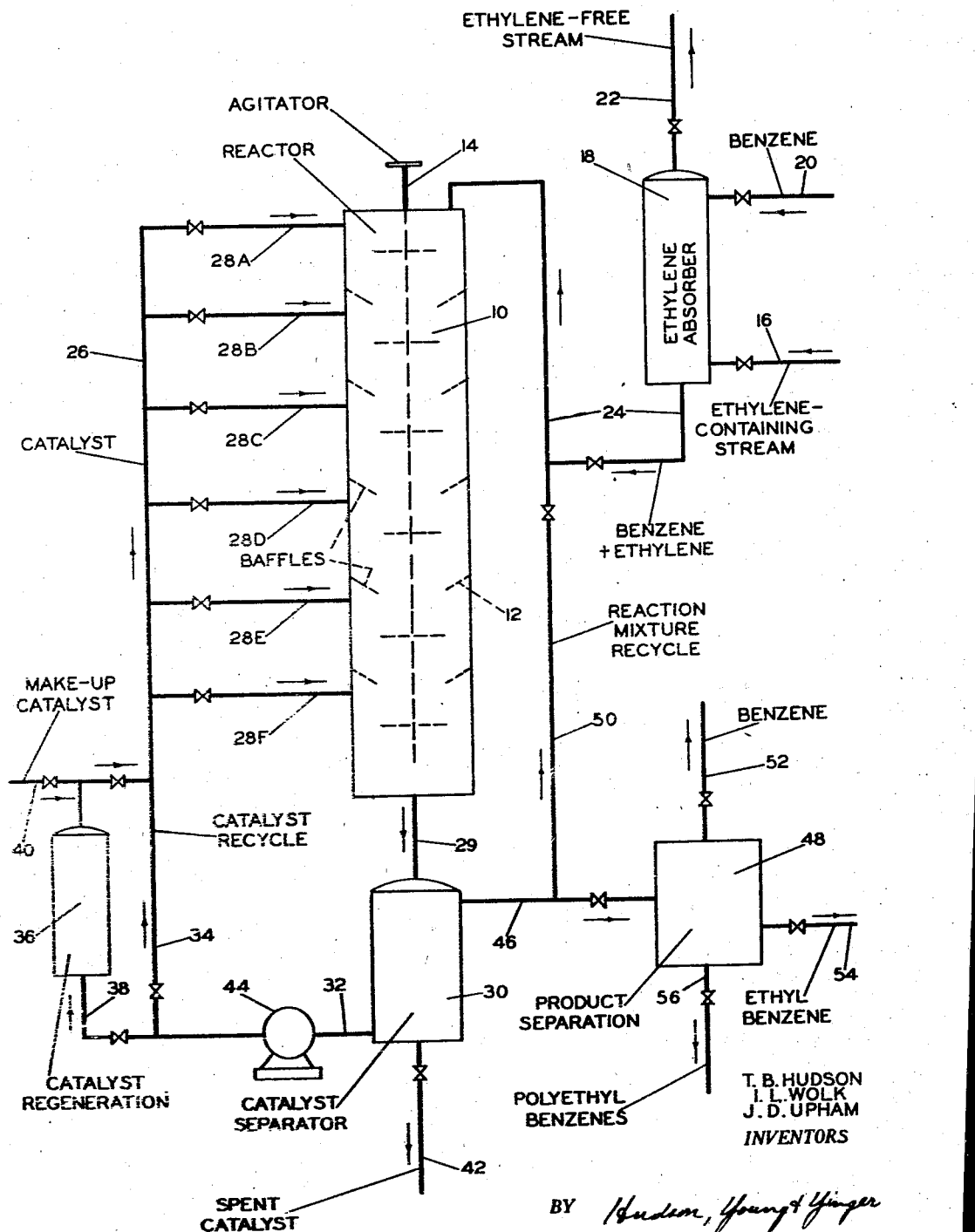

Sept. 2, 1947.  T. B. HUDSON ET AL  2,426,611
ALKYLATION PROCESS
Filed Dec. 4, 1942  2 Sheets-Sheet 2

T.B. HUDSON,
I.L. WOLK,
J.D. UPHAM
INVENTORS

BY Hudson Young & Yinger
ATTORNEYS

Patented Sept. 2, 1947

2,426,611

UNITED STATES PATENT OFFICE 2,426,611

ALKYLATION PROCESS

Thomas B. Hudson, I. Louis Wolk, and John D. Upham, Bartlesville, Okla., assignors to Phillips Petroleum Company, a corporation of Delaware Application December 4, 1942, Serial No. 467,844

5 Claims. (Cl. 260—671)

1

This invention relates to the catalytic alkylation of hydrocarbons. It particularly relates to the alkylation of alkylatable hydrocarbons wherein a mobile catalyst is used. A preferred embodiment of the invention has to do with the alkylation of isoparaffins with olefins using a liquid alkylation catalyst.

Processes involving the alkylation of hydrocarbons have become of great commercial importance in the past few years. Perhaps the most widely used are the alkylation of isoparaffins with olefins to produce high octane number liquid isoparaffins suitable for inclusion in motor fuels, and the alkylation of aromatics with olefins or alcohols to produce alkylated aromatic compounds such as ethyl benzene, isopropyl benzene, etc. Numerous catalysts have been proposed for effecting alkylation reactions, and several have already met with commercial success. Among the catalysts frequently mentioned for effecting one or more alkylation reactions may be mentioned sulfuric acid, phosphoric acid, boron fluoride, chlorosulfonic acid, hydrogen fluoride, aluminum chloride, sodium aluminum chloride, and silica-alumina. Thus, solid, liquid, and gaseous catalysts have been described. It will be appreciated that a given catalyst may be used with good results for some particular combination of alkylation reactants, while with other alkylation reactants it may be less desirable or unsuitable.

This invention is particularly applicable to the alkylation of relatively low-boiling hydrocarbons such as normally gaseous isoparaffins and normal paraffins, low-boiling normally liquid paraffins, for example isopentane, normal hexane, isooctane, etc., cycloparaffins, such as cyclohexane, low-boiling aromatics such as benzene, toluene, etc. Among suitable alkylating agents which may be used are olefins, preferably relatively low-boiling olefins, alcohols, alkyl halides, etc.

By the term "mobile alkylation catalyst" as used herein is meant a material which catalyzes alkylation reactions and which may be moved through a reaction zone. For example, gaseous or liquid catalysts may be passed concurrently with, and sometimes countercurrently to, reactants. Solid catalysts may be used in a state of fine subdivision, or even in relatively large particles, and passed concurrently with, or countercurrently to, one or more reactants through the reaction zone. It is with such mobile catalysts and their use in effecting alkylation reactions that this invention is particularly concerned.

For the sake of convenience we shall describe a preferred form of our invention with special reference to the alkylation of low-boiling isoparaffins, such as isobutane, with low-boiling olefins, such as butenes, in the presence of a liquid acid alkylation catalyst, such as concentrated sulfuric or hydrofluoric acids. However, its applicability to other alkylation processes, using other reactants and/or other catalysts, will be readily apparent to those skilled in the art in view of the disclosure and detailed description offered herein.

The mol ratio of alkylatable hydrocarbon to alkylating agent should be appreciably greater than 1:1, and in the reaction zone itself it is preferably greater than 9:1. When particularly pure hydrocarbons or a motor fuel stock of high octane number are desired as products, the mol ratio of alkylatable hydrocarbon to alkylating reactant may need to be as high as 50:1 or 100:1 or more, particularly when the alkylating reactant is an olefin. Accordingly, addition of olefins, or the like, in successive small portions to a reacting stream, as taught by Frey in U. S. Patent 2,002,394, is the preferred manner of operating.

The yield and quality of alkylate obtainable from a given alkylation reaction mixture is dependent on a great many variables, among which may be mentioned temperature, ratio of paraffins to olefins, catalyst, ratio of catalyst to reactants, reaction time, degree of spending of the catalyst, acid concentration in the case of acid catalysts, extent of mixing of catalyst and reactants. Thus, unless careful control is had over all of these variables, and unless the factors influencing the course of the reaction are properly correlated, optimum results are not obtained. In fact, a very unsatisfactory product may result from only apparently minor fluctuations or changes of one or more operating conditions.

The operating conditions, furthermore, frequently vary from point to point in the reaction zone. Alkylation is a highly exothermic reaction, and a considerable temperature rise is liable to occur unless strong cooling is provided. The catalyst becomes less active as the reaction proceeds, thus tending to lower the reaction rate. As more and more isoparaffins become alkylated, their concentration in the total reaction mixture decreases while the concentration of alkylate product increases. Numerous side reactions, involving both primary reactants and products, can occur to a certain extent under ordinary alkylation conditions, and it is desirable that the concentration of alkylate, as well as reacting olefins, be held to a relatively low value in the total reaction mixture. Thus, the changing of reaction conditions as the reaction mixture proceeds through the reaction zone tends to give less than optimum results.

One object of our invention is to alkylate hydrocarbons. It is another object of this invention to provide improved methods for effecting alkylation reactions. Another object is to provide improvements in the alkylation of hydrocarbons utilizing mobile alkylation catalysts. Another object is to enable a more delicate control of such alkylation processes than has hitherto been known. A further object is to provide improved methods of contacting liquid alkylation catalysts with hydrocarbon reactants. A further object is to permit controlled variation in the quantity and/or activity of catalyst present at all points in the reaction zone. Another object is to improve the catalytic alkylation of relatively low-boiling alkylatable hydrocarbons with low-boiling olefins. A still further object is to correlate the catalyst activity at various points throughout an alkylation reaction zone with reaction conditions prevailing at said points in order to equalize reaction rates. Further objects and advantages of the invention will be apparent from the accompanying disclosure and description.

Briefly, our invention involves introducing mobile alkylation catalyst into contact with alkylation reactants at a plurality of points spaced in the direction of flow of reactants. The activity of catalyst thus introduced, or the ratio of catalyst activity to volume of reactants in the reaction zone, is correlated with reaction conditions so as to at least partially overcome undesired effects of changing reaction conditions. Important among reaction conditions affecting the rate and/or course of reaction are temperature, concentration of one or more reactants, and activity of catalyst. By the use of our invention we may so inter-relate the various factors such as temperature, flow rate of reactants, diluents, and catalysts, catalyst activity, time of contact between reactants and catalyst, etc., as to provide a most complete and delicate control over the nature and extent of the alkylation reaction at all points in the reaction zone.

The type of operation disclosed herein, where catalyst is introduced into a reaction zone at a plurality of points, is to be definitely distinguished from the introduction of catalyst at a single point in a stream of reactants flowing in a closed endless circuit. In this latter type of operation the concentration of catalyst at each point in the reaction zone at any given time is substantially constant, that is, there is just as much catalyst in one section as there is in another. In contrast, when operating in accordance with our invention, the amount of catalyst at any given time varies from point to point in the reaction zone. Thus, for example, there may be twice as much catalyst in one section of the reaction zone as there is in another section. It is the variation in catalytic activity from point to point in the reaction zone which makes possible the desired control over the reaction, which control is not possible by conventional methods.

Alkylation reactions are highly exothermic, and a rise in temperature due to the heat of reaction may unfavorably affect the course of reaction. Through use of our invention, such heat of reaction may more readily be controlled, and if the temperature is allowed to rise, the amount and/or concentration of the catalyst, for example, hydrofluoric acid, is readily correlated with the temperature at different points in the reaction zone to correspond to the optimum value for each temperature.

In case alcohols are utilized as alkylating agents, the water produced in the reaction will dilute and decrease the activity of the catalyst. Our invention provides a ready method for overcoming this difficulty.

In conjunction with the multipoint addition of catalyst, we may utilize mixtures of partially spent and fresh or reactivated catalyst at one or more points in order to obtain the desired activity of catalyst. Or recirculated catalyst may be used, with fresh catalyst introduced alone at one or more points after the first. The catalyst stream to one or more points may be cooled for effecting temperature control. One or more reactants, such as either or both the alkylatable hydrocarbon and the alkylating agent, and/or diluents and modifying agents, may be introduced into the reaction zone along with the catalyst. Catalyst activators may be introduced with, or separately from, the catalyst when desired. These and many other modifications may be used as found advantageous for any particular system.

In order to afford a better understanding of the principles involved and of the manner of putting them into practice, the accompanying drawings are provided, wherein two modifications of the invention are shown in detail. It will be understood that many conventional pieces of equipment, such as pumps, fractionating towers, accumulators, etc., are not shown, as they will readily be supplied by one skilled in the art.

Figure 2:
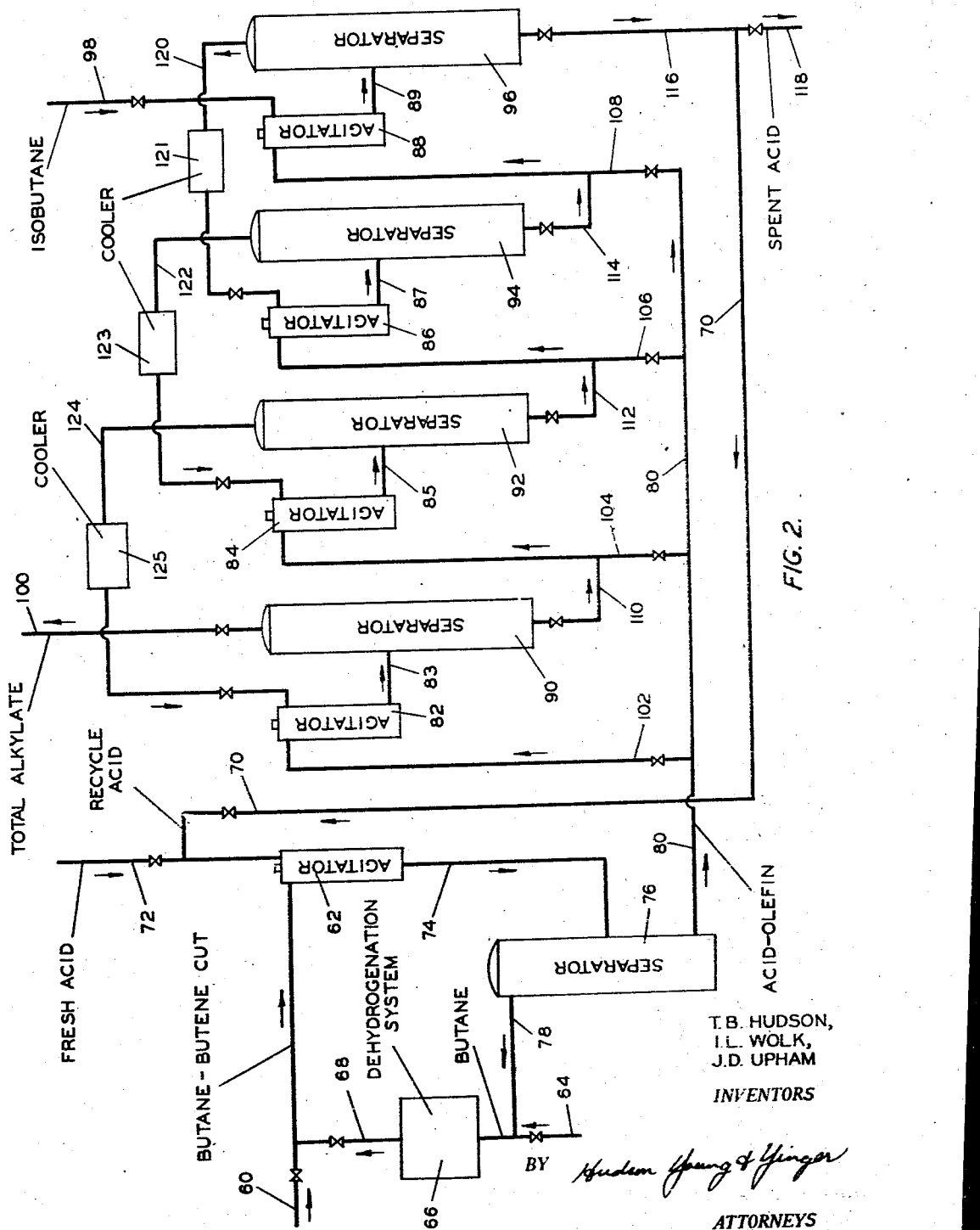

Referring now to the drawings, which with the accompanying discussion will serve to exemplify our invention, Figure 1 shows diagrammatically an arrangement of equipment suitable for practicing a preferred modification of the invention in alkylating benzene with ethylene in the presence of a slurry of metal halide alkylation catalyst, such as finely divided aluminum chloride. Figure 2 shows in diagrammatic form one arrangement of equipment for practicing another preferred modification of the invention wherein isobutane is alkylated with butene, using an acid alkylation catalyst.

In Figure 1, a reactor 10 is provided, preferably made of or lined with ceramic ware to resist the erosion and/or corrosion of the finely divided catalyst. The interior of reactor 10 is provided with baffles 12 and an agitator 14, which latter may take the form of paddles mounted on a revolving shaft as shown. The baffles and agitator are also made of material resistant to corrosion, for example ceramic ware or certain hard alloys such as Hastelloy, and serve to ensure intimate contact of catalyst and reactants while allowing regular flow of reactants and catalyst downwardly through the reactor 10. An ethylene-containing stream 16, such as one obtained by oil cracking, dehydrogenation of ethane, or in other ways well known to the art, is introduced into the bottom of absorber 18, which may be a packed tower or other means suitable for effecting intimate contact of gases with liquids. Benzene is introduced into the top of absorber 18 via line 20, and in passing downwardly therethrough absorbs ethylene from the upwardly flowing gases. The denuded gas leaves via line 22, while the benzene containing dissolved ethylene passes from absorber 18 via line 24 for introduction into reactor 10. Suitable pressure and temperature conditions for absorber 18 may be readily chosen for any particular gas stream by one skilled in the art, so that the product in line 24 contains the desired ratio of benzene to ethylene.

Alkylation catalyst, which preferably is finely divided aluminum chloride suspended in liquid hydrocarbons to form a slurry, is introduced into reactor 10 from conduit 26 at a plurality of points via valved lines 28A to 28F inclusive. A greater or smaller number of lines 28 may be used as desired. Excess reactants, products, and catalyst flow from the bottom of reactor 10 via line 29 into a catalyst-separating chamber 30 wherein the catalyst is allowed to settle out, or is preferably removed by filtration or centrifuging, from most or all of the liquid hydrocarbons. Generally a fair proportion of this catalyst, which exits from unit 30 via line 32, is recycled to conduit 26 via line 34. A portion of the catalyst from line 32 may be passed through a regeneration system 36 via line 38. Make-up catalyst is added to the system via line 40, while spent catalyst leaves separator 30 via line 42. Methods of recovering and/or regenerating aluminum chloride from partially or totally spent sludge are known to the art and need not be discussed in detail here. A pump 44 is shown in line 32 for circulating catalyst through the system. Ordinarily a slurry or sludge is formed, as by suspending the finely divided aluminum chloride in reaction mixture or other hydrocarbons, and this slurry may be pumped or otherwise forced through the system. In some cases, anhydrous hydrogen chloride or other catalyst activator may be introduced into the reaction zone in any convenient manner.

The hydrocarbon portion of the reaction mixture passes from separator 30 through line 46 to product separation means 48. Part of this stream may be recycled to reactor 10 via lines 50 and 24. Product separation means 48 usually is a fractional distillation system, from which unreacted benzene is separated via line 52, ethyl benzene is removed via line 54 as a product of the process, and polyethylbenzenes, mainly di- and tri-ethyl benzenes, are recovered via line 56. The benzene from line 52 may be returned to line 20 or direct to reactor 10 by means not shown. The polyethylbenzenes from line 56 may in some cases be recycled to the reaction zone wherein they undergo a certain amount of dealkylation. Or, dealkylation may be carried out in a separate system.

As the mixture of ethylene and benzene enters the reactor, it contains the maximum content of ethylene. This mixture contacts a small increment of catalyst introduced through line 28A. Alkylation proceeds, and as the total reaction mixture flows down through the reactor, the ethylene concentration decreases. However, the concentration of catalyst increases, due to its addition through lines 28B, 28C, etc. Thus, although the rate of reaction would normally tend to decrease, due to decrease in concentration of the ethylene reactant, the increased catalyst concentration acts to overcome this tendency, and at least partially compensates therefor. Thus a more regular rate of reaction is established throughout the reaction zone, over-reaction at the inlet thereof being minimized, while a more equal proportion of the total reaction is accomplished in the latter part of the reaction zone.

In Figure 2, an olefin-containing stream, such as a butane-butene cut obtained from refinery operations, enters the system via line 60 and is passed to agitator 62. Alternatively or additionally, normal butane from line 64 may be dehydrogenated, preferably catalytically, in known manner as shown diagrammatically at 66, and a C4 product containing butenes and unconverted butane passed via lines 68 and 69 to agitator 62. Acid to be used as alkylation catalyst, usually mixed with a large amount of recycle acid from line 70, passes to agitator 62 via line 72. This acid is preferably concentrated sulfuric or hydrofluoric acid. In the case of sulfuric acid, the absorption and alkylation systems are preferably maintained at from 25 to 50° F., while with hydrogen fluoride the temperatures may preferably range from 25 to 130° F. The titratable acid strength is usually from 85 to 95 per cent by weight if sulfuric acid is used, or from 70 to 95 per cent by weight with hydrofluoric acid. In agitator 62, an intimate contact between the hydrocarbons, preferably in liquid form, and the acid is effected, and the mixture is then passed via line 74 to separator 76, where a lower acid phase and an upper hydrocarbon phase separate out. The contacting of acid with hydrocarbons causes the butenes to dissolve in the acid, and they are thus separated from the normal butane, which will constitute the hydrocarbon phase, and which may be passed from separator 76 via line 78 to dehydrogenation 66 or other usage.

The acid layer, which contains dissolved butenes, is now passed from separator 76 to the alkylation system proper via conduit 80. The alkylation is carried out continuously in apparatus which comprises four agitators 82, 84, 86, and 88, and four separators 90, 92, 94, and 96, each agitator being connected for flow to the corresponding separator by lines 83, 85, 87, and 89, respectively. More or less than four may be used as conditions require. The agitators are provided with means, such as high-speed stirrers and/or baffles, to effect a very intimate contact of acid with hydrocarbon. The mixtures thus produced are passed into the separators, which are designed to allow acid and hydrocarbon phases to settle out. The design of these pieces of equipment is now well within the skill of the art. The agitators are of such size that the desired contact time is obtained, and although they are shown in the drawing as being of equal capacity, this need not necessarily be the case.

In the alkylation as shown, the hydrocarbons pass countercurrently to the acid. Isobutane to be alkylated is introduced into agitator 88 via line 98, while the total alkylate leaves separator 90 via line 100. The catalyst and olefin mixture is introduced into the system at a plurality of points, passing from conduit 80 into agitators 82, 84, 86, and 88 via lines 102, 104, 106, and 108, respectively. The acid-olefin mixture in lines 104, 106, and 108 is joined by acid passing from the bottoms of separators 90, 92, and 94, respectively, via lines 110, 112, and 114, respectively. Acid leaves the bottom of separator 96 via line 116, and is largely recycled through conduit 70, while part is separated from the system as spent acid through line 118, and may be passed to acid recovery of purification means as desired. The hydrocarbon portion of the reaction mixture passes from the top of separator 96 via line 120 to agitator 86, from the top of separator 94 via line 122 to agitator 84, from the top of separator 92 via line 124 to agitator 82, and finally as total alkylate from the top of separator 90 via line 100 as described above. Coolers 121, 123, and 125 may be provided in lines 120, 122, and 124, respectively, for removing the exothermic heat of reaction from the system. Another advantageous method of controlling the temperatures is to provide the acid streams from conduit 80 at lower temperatures than those maintained in the agitators. The entire alkylation system is preferably maintained under sufficient pressure to keep the hydrocarbons in liquid phase throughout.

The isobutane upon entering agitator 88 comes into contact with acid from separator 94 and acid from conduit 80, and with butenes from conduit 80. The butenes alkylate the isobutane, and the mixture of acid and hydrocarbon going into separator 96 contains a large excess of isobutane, some normally liquid hydrocarbons, principally octanes, produced by the alkylation, and is almost free of butenes. The hydrocarbon material separates out as an upper layer in separator 96, and passes on to agitator 86, wherein it contacts acid from separator 92 and from conduit 80, and additional butenes from conduit 80. It will be seen that in this way, the concentration of butenes in the reaction mixture is always kept low, thus giving a high yield of high-quality alkylate. The total alkylate leaving separator 90 still contains a large excess of isobutane, since it is best not to allow too high a concentration of alkylation products in the reaction mixture. The total alkylate is passed to separating means not shown, first passing through a caustic wash in the case of sulfuric acid alkylation, and the excess isobutane is separated and returned to line 98. A motor fuel cut, generally comprising up to 90 per cent or more of the liquid products, is also separated out. One skilled in the art can readily accomplish these separations, which accordingly, for the sake of simplicity in the drawing, are not shown. In the case of hydrofluoric acid alkylation, the hydrocarbon phase will contain substantial amounts of hydrogen fluoride, which is separated as an azeotrope with isobutane, and may thus be recovered and recycled to the system.

The time elapsing between absorption of olefins in the acid in unit 62 and their introduction into the alkylation reaction zones should be kept as short as possible, in order to avoid any extensive polymerization prior to contact with the isobutane. Maintaining a high acid to olefin ratio in the absorption system and conduit 80 also assists in minimizing such polymerization. The time and acid-olefin ratio are generally more critical in the case of sulfuric acid than in the case of hydrofluoric acid.

It will be seen that by operating in accordance with this particular modification of our invention, the isobutane to be alkylated comes into contact with varying amounts of acid in each agitator or reactor, the amount of acid diminishing in the direction of flow of isobutane, or increasing in the direction of flow of acid, since it is a counter-current flow system. We have found that superior results are obtained by this mode of operation, which may be attributable to several factors. In the reactor wherein the largest concentration of alkylate is found, that is agitator 82, the ratio of acid to hydrocarbon is lowest, and this quite possibly minimizes undesired side reactions involving the liquid hydrocarbon products. As the acid passes through the system, it loses strength, the extent of this loss being, of course, dependent upon acid to hydrocarbon ratios and other operating conditions. The multipoint addition of acid tends to overcome this loss of strength since it acts to fortify the acid stream. Furthermore, the amount of acid and olefin introduced at each point is readily changed at any time during a run, and this proves very helpful by enabling the operator to maintain a close control over each reactor at all times. While the acid and olefin are added together in this manner of operating, these and other advantages are also obtainable by multipoint addition of the acid when the olefin is added independently of the acid in any known way.

While preferred modes of carrying out our invention have been described, particularly in connection with the alkylation of specific alkylatable hydrocarbons with specific alkylating agents using specific catalysts, it is to be understood that the invention is not to be unduly limited thereby, as it may be readily applied to many other systems by one skilled in the art, following the teachings of this disclosure.

We claim:

1. A process for the alkylation of a low-boiling alkylatable paraffin hydrocarbon with a low-boiling olefin using a liquid acid alkylation catalyst which comprises flowing a stream of such a paraffin hydrocarbon through a series of contactors and settlers, maintaining alkylation conditions in said contactors, introducing low-boiling olefin into each of said contactors, introducing catalyst into each of said contactors from an extraneous source and into each of said contactors except the last from succeeding settlers as described hereinbelow, maintaining a large excess of said low-boiling alkylatable paraffin hydrocarbon over said low-boiling olefin throughout said series of contactors and settlers, effecting intimate contact between hydrocarbons and catalyst in said contactors to produce normally liquid hydrocarbons substantially solely by alkylation of said low-boiling alkylatable paraffin hydrocarbon with said olefin, passing a mixture of hydrocarbons and catalyst from each of said contactors to the first succeeding settler in the series and separating therein a hydrocarbon phase and a catalyst phase, passing hydrocarbon phase from each of said settlers except the last to the first succeeding contactor in the series while passing catalyst phase from each of said settlers except the first to the second preceding contactor in the series to effect countercurrent flow of catalyst and hydrocarbons in said system, withdrawing hydrocarbons from the last settler in the series, withdrawing catalyst from the first settler in the series, and separately controlling the activity, quantity and temperature of the catalyst introduced into each of said contactors from said extraneous source so as to provide an increasing amount of catalyst in the direction of flow of catalyst and to remove a substantial amount of the heat of reaction.

2. A process according to claim 1 in which said low-boiling alkylatable paraffin hydrocarbon is isobutane.

3. A process according to claim 1 in which said liquid alkylation catalyst is concentrated sulfuric acid.

4. A process according to claim 1 in which said liquid alkylation catalyst is concentrated hydrofluoric acid.

5. A process for the alkylation of an alkylatable hydrocarbon with an olefin using a mobile alkylation catalyst which comprises flowing a stream of such an alkylatable hydrocarbon through a series of contactors and settlers, maintaining alkylation conditions in said contactors, introducing olefin into each of said contactors, introducing catalyst into each of said contactors from an extraneous source and into each of said contactors except the last from succeeding settlers as described hereinbelow, maintaining a large excess of said alkylatable hydrocarbon over said olefin throughout said series of contactors and settlers, effecting intimate contact between hydrocarbons and catalyst in said contactors to produce alkylated hydrocarbons substantially solely by alkylation of said alkylatable hydrocarbon with said olefin, passing a mixture of hydrocarbons and catalyst from each of said contactors to the first succeeding settler in the series and separating therein a hydrocarbon phase and a catalyst phase, passing hydrocarbon phase from each of said settlers except the last to the first succeeding contactor in the series while passing catalyst phase from each of said settlers except the first to the second preceding contactor in the series to effect countercurrent flow of catalyst and hydrocarbons in said system, withdrawing hydrocarbons from the last settler in the series, withdrawing catalyst from the first settler in the series, and separately controlling the activity, quantity and temperature of the catalyst introduced into each of said contactors from said extraneous source so as to provide an increasing amount of catalyst in the direction of flow of catalyst and to remove a substantial amount of the heat of reaction.

THOMAS B. HUDSON.
I. LOUIS WOLK.
JOHN D. UPHAM.

REFERENCES CITED

The following references are of record in the file of this patent:

UNITED STATES PATENTS

| Number | Name | Date |
|---|---|---|
| 2,161,974 | Peck | June 13, 1939 |
| 2,176,234 | Gaylor | Oct. 17, 1939 |
| 2,198,595 | Amos et al. | Apr. 30, 1940 |
| 2,267,097 | Hatch et al. | Dec. 23, 1941 |
| Re. 22,146 | Goldsby et al. I | July 28, 1942 |
| 2,246,703 | Thiele et al. | June 24, 1941 |
| 2,260,990 | Goldsby et al. II | Oct. 28, 1941 |
| 2,261,004 | Story | Oct. 28, 1941 |
| 2,267,730 | Grosse et al. | Dec. 30, 1941 |
| 2,275,312 | Tinker et al. | Mar. 3, 1942 |
| 2,281,248 | Putney | Apr. 28, 1942 |
| 2,290,211 | Schaad | July 21, 1942 |
| 2,305,026 | Munday | Dec. 15, 1942 |
| 2,332,564 | Egloff | Oct. 26, 1943 |
| 2,335,704 | Smith | Nov. 30, 1943 |
| 2,325,052 | Grosse et al. | July 27, 1943 |
| 2,256,880 | Goldsby et al. | Sept. 23, 1941 |
| 2,260,990 | Goldsby et al. | Oct. 28, 1941 |
| 2,269,250 | Bruner | Jan. 6, 1942 |